(12) United States Patent
Hertzberg

(10) Patent No.: US 6,460,328 B1
(45) Date of Patent: Oct. 8, 2002

(54) METHOD OF OPERATING AN EXHAUST-EMISSION CONTROL SYSTEM WITH A NITROGEN OXIDE ADSORBER AND A LOADING SENSOR

(75) Inventor: Andreas Hertzberg, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/709,642

(22) Filed: Nov. 13, 2000

(30) Foreign Application Priority Data

Nov. 12, 1999 (DE) .......................... 199 54 549

(51) Int. Cl.⁷ ................................. F01N 3/00
(52) U.S. Cl. ............................. 60/285; 60/274; 60/295; 60/297
(58) Field of Search ................ 60/285, 295, 297, 60/274, 301, 276, 286

(56) References Cited

U.S. PATENT DOCUMENTS

| | | | | |
|---|---|---|---|---|
| 5,437,153 A | * | 8/1995 | Takeshima et al. ........... | 60/276 |
| 5,771,686 A | | 6/1998 | Pischinger et al. ........... | 60/274 |
| 6,032,461 A | * | 3/2000 | Kinugasa et al. ............. | 60/295 |
| 6,161,378 A | * | 12/2000 | Hanaoka et al. .............. | 60/286 |
| 6,173,571 B1 | * | 1/2001 | Kaneko et al. ............... | 60/286 |
| 6,233,925 B1 | * | 5/2001 | Hirota et al. ................. | 60/285 |
| 6,308,515 B1 | * | 10/2001 | Bidner et al. ................. | 60/274 |

FOREIGN PATENT DOCUMENTS

| | | |
|---|---|---|
| DE | 195 43 219 | 12/1996 |
| DE | 196 36 790 | 3/1998 |
| DE | 197 07 849 | 9/1998 |
| DE | 197 16 275 | 9/1998 |
| DE | 197 53 718 | 7/1999 |
| DE | 199 12 832 | 9/1999 |
| DE | 199 16 677 | 1/2001 |
| EP | 0 598 917 | 6/1994 |
| EP | 0 733 787 | 9/1996 |
| EP | 0 84 248 | 6/1997 |
| EP | 0 869 263 | 10/1998 |
| JP | 9 088 560 | 3/1997 |
| JP | 11 229 847 | 8/1999 |

* cited by examiner

Primary Examiner—Thomas Denion
Assistant Examiner—Binh Tran
(74) Attorney, Agent, or Firm—Crowell & Moring, LLP

(57) ABSTRACT

A method of operating an exhaust-emission control system with a nitrogen oxide adsorber and a loading sensor includes alternately operating the nitrogen oxide adsorber in adsorption phases with an at least stoichiometric exhaust air ratio and in regeneration phases with an at most stoichiometric exhaust air ratio. The loading sensor is able to ascertain continuously the nitrogen oxide loading of the adsorber even during the regeneration phases. By suitable evaluation of the loading sensor signal, the time for a changeover from an adsorption phase to a desorption phase and vice versa is determined. In addition, the storage capacity of the adsorber at a given time, when desulphating of the adsorber should take place, and whether the desulphating effect achieved was adequate, are determined.

10 Claims, 6 Drawing Sheets

METHOD OF OPERATING AN EXHAUST-EMISSION CONTROL SYSTEM WITH A NITROGEN OXIDE ADSORBER AND A LOADING SENSOR

BACKGROUND AND SUMMARY OF INVENTION

This application claims the priority of German patent document DE 199 54 549.9, filed on Nov. 12, 1999, the disclosure of which is expressly incorporated by reference herein.

The present invention relates to a method of operating an exhaust-emission control system with a nitrogen oxide adsorber and an assigned nitrogen-oxide loading sensor, the method providing that the nitrogen oxide adsorber is operated alternately in adsorption phases with an at least stoichiometric exhaust air ratio and in regeneration phases with an at most stoichiometric exhaust air ratio.

Operating methods for exhaust-emission control systems which have a nitrogen oxide adsorber are known in many forms, in particular for cleaning exhaust gas from motor-vehicle combustion engines operated predominantly on a lean mixture. In lean operating phases of the combustion device emitting the exhaust gas to be cleaned, such as a motor-vehicle spark-ignition engine operated predominantly on a lean mixture, the nitrogen oxide adsorber stores nitrogen oxides contained in the exhaust gas by adsorption. It is possible for the nitrogen oxides not to be reduced adequately to nitrogen, for example by a three-way catalyst, because of the oxygen excess and consequently the lack of reducing agents in the exhaust gas. The loading of the nitrogen oxide adsorber, also known as a nitrogen-oxide adsorber catalyst, with nitrogen oxides, mainly in nitrate form, increases continuously in the course of a lean operating phase. When its storage capacity is exhausted and it cannot adsorb any further nitrogen oxides, a changeover is made from the lean operation of the combustion device, which corresponds to an adsorption phase of the nitrogen oxide adsorber, briefly to a rich operating phase, in which the nitrogen oxide adsorber is fed an exhaust gas with an at most stoichiometric exhaust air ratio (generally with a substoichiometric air ratio, i.e. with a rich composition of the exhaust gas). This may take place, for example, by changing over the combustion device from the previous lean operation with an at least stoichiometric oxygen component in the fuel/air mixture to be burned to rich operation with a rich mixture; by injecting reducing agents directly into the exhaust gas upstream of the nitrogen oxide adsorber; and/or by other known methods. The rich operating phase corresponds to a regeneration phase of the nitrogen oxide adsorber, in which the nitrogen oxides temporarily stored in it are desorbed and then converted by reducing agents adequately present in the fed-in rich exhaust gas. The conversion may take place, for example, in the nitrogen-oxide adsorber body itself if a three-way catalyst is integrated therein; or in a downstream nitrogen-oxide reduction catalyst; or, for example, also by exhaust gas recirculation. The use of a three-way catalyst ensures effective nitrogen oxide conversion even in the stoichiometric range of the combustion device.

During the operation of such an exhaust-emission control system, it is desirable to change over between the alternating adsorption and regeneration phases of the nitrogen oxide adsorber at the most favourable possible time in each case. In general, the longest possible lean operation of the combustion device is desired for fuel consumption reasons, interrupted only from time to time by shortest possible rich operating phases for the regeneration of the nitrogen oxide adsorber fully loaded with nitrogen oxides. To find the most favourable switching times for the changes between the usually relatively long adsorption phases and the usually relatively short regeneration phases of the nitrogen oxide adsorber, the most accurate possible knowledge of the loading state of the nitrogen oxide adsorber at a given time is to be desired.

Conventionally, it is attempted in particular to determine the loading of the nitrogen oxide adsorber indirectly in the form of an estimate of the same on the basis of operating parameters of the exhaust-emission control system and the combustion device with the assistance of a mathematical modelling of the system, see for example the laid-open patent application EP 0 598 917 A1. A further indirect method of determining the loading uses the signal of a lambda probe arranged downstream of the nitrogen oxide adsorber, see for example the laid-open patent application EP 0 733 787 A2.

Alternatively, laid-open patent application DE 196 36 790 A1 proposes a direct determination of the loading of the nitrogen oxide adsorber by means of a corresponding loading sensor system, which comprises a nitrogen oxide sensor respectively upstream and downstream of the nitrogen oxide adsorber. With this loading sensor system, the increase in loading during a respective adsorption phase can be read off directly from the differential signal of the two nitrogen oxide sensors. At the end of a respective regeneration phase, an assigned loading counter is set to zero, and a changeover is then made from the following adsorption phase to the next regeneration phase if a predetermined maximum loading state is exceeded, i.e. the loading counter has exceeded a predetermined value.

A further directly measuring nitrogen-oxide loading sensor is described in German Patent Application No. 199 16 677.3, which is not a prior publication. This loading sensor makes use of the fact that the dielectric constant of the adsorber material depends in a one-to-one way on the degree of loading, so that the loading of the nitrogen oxide adsorber with adsorbed nitrogen oxides at a given time can be ascertained directly from a measurement of the dielectric constant of the adsorber material. It is of particular advantage in the case of this loading sensor that the decrease in loading of the nitrogen oxide adsorber during a respective regeneration phase can also be continuously sensed.

As is known, during the operation of the nitrogen oxide adsorber there is frequently a gradual decrease in its storage capacity, in particular due to chemical changes on account of excessive thermal effects and due to sulphur contained in the fuel, which is adsorbed in the adsorption phases in the form of sulphur compounds, in particular sulphates, in competition with the nitrogen oxides. By suitable special regeneration phases in the form of desulphating phases, this sulphur-dependent reduction in storage capacity can be at least partially reversed. The laid-open patent application EP 0 869 263 A1 discloses the carrying out of such desulphating phases. The incorporation of sulphur into the nitrogen oxide adsorber is modelled and a respective desulphating operation is introduced if a corresponding threshold value is exceeded. In addition, the incorporation of nitrogen oxides into the nitrogen oxide adsorber during a respective adsorption phase is also estimated on a model basis. The underlying exhaust-emission control system in this case comprises, inter alia, a lambda probe respectively upstream and downstream of the nitrogen oxide adsorber.

The technical problem on which the invention is based is that of providing an operating method of the type stated at the beginning for an exhaust-emission control system with a nitrogen oxide adsorber and an associated loading sensor which makes possible in particular a comparatively good control of the changes between the adsorption and regeneration phases of the nitrogen oxide adsorber in dependence on the loading state of the nitrogen oxide adsorber.

In the case of the method according to the present invention, it is specifically provided to sense the loading of the nitrogen oxide adsorber with nitrogen oxides continuously during a respective regeneration phase with a directly measuring loading sensor provided for this purpose, and to increase the air ratio of the exhaust gas fed to the nitrogen oxide adsorber in dependence on the measured loading as the measured loading decreases. As a result, the regenerating operation is adapted in an advantageous way to the current, decreasing loading of the nitrogen oxide adsorber (i.e., the proportion of reducing agents in the exhaust gas is successively reduced in the course of the regeneration phase). A breakthrough of reducing agent, i.e. excessive reducing agent remaining in the exhaust gas emerging from the nitrogen oxide adsorber, as threatens to occur particularly towards the end of the regeneration phase, can be reliably avoided in this way.

The method according to another embodiment of the present invention likewise makes use of a directly measuring loading sensor and relates specifically to the choice of the most favourable time for ending a respective regeneration phase. For this purpose, in a first variant, the decreasing nitrogen oxide loading of the nitrogen oxide adsorber is continuously measured by the loading sensor. If the measured loading falls below a predeterminable lower threshold value, this is evaluated as a criterion for ending regeneration (i.e., the regeneration phase is ended at this time unless other criteria preclude this). In a second variant, the gradient of the continuously measured, decreasing nitrogen oxide loading is ascertained during the regeneration phase. If the amount of the loading gradient thus ascertained has fallen below a predeterminable associated threshold value, this is evaluated as a criterion for ending regeneration. In a third variant, the decrease in the nitrogen oxide loading measured by the loading sensor is continuously monitored from the beginning of the regeneration phase. As soon as this decrease in loading has reached an amount exceeding a predeterminable associated threshold value, this is evaluated as a criterion for ending regeneration.

The method according to another embodiment of the present invention uses the nitrogen-oxide loading sensor specifically for the purpose of determining from time to time the current storage capacity of the nitrogen oxide adsorber. For this purpose, the nitrogen oxide adsorber is initially saturated with nitrogen oxides in an adsorption phase. Following this, it is completely regenerated, i.e. until the loading measured by the loading sensor reaches a minimum value from which it no longer markedly decreases. The difference between the maximum loading, measured in the state of saturation at the beginning of the regeneration phase, and the minimum value at the end of the regeneration phase is then evaluated as a measure of the current storage capacity of the nitrogen oxide adsorber.

The method according to another embodiment of the present invention specifically has the aim of detecting a remaining residual loading of the nitrogen oxide adsorber, with which the nitrogen oxide adsorber remains loaded even after a regeneration phase has been completed, for example by the incorporation of sulphur or by thermal ageing. A gradual increase in the residual loading means a corresponding reduction in the storage capacity of the nitrogen oxide adsorber. For this purpose, the current loading of the nitrogen oxide adsorber is sensed with the preferably directly measuring loading sensor towards the end of a respective regeneration phase, at least at the time when a predeterminable condition for ending regeneration occurs, and the minimum loading measured in such a way is evaluated as a measure of the current remaining residual loading of the nitrogen oxide adsorber.

In another development of the present invention, the storage capacity determination or the residual loading determination is used for promptly detecting that a special regenerating operation for desulphating the nitrogen oxide adsorber should be carried out. The carrying out of a desulphating operation is indicated whenever the difference between saturation loading and minimum loading, indicative of the storage capacity at a given time, falls below an associated threshold value or whenever the minimum loading, indicative of the remaining residual loading at the end of the respective regeneration, rises over time by more than a predeterminable degree.

In a further refinement of the measure of performing a desulphating operation at certain times, a sensing of the desulphating effect, and consequently regenerating effect achieved by the respective desulphating operation, is provided. In a first alternative, the difference in loading, indicative of the storage capacity, as obtained for a final storage capacity determination before a desulphating operation, is compared with the difference in loading of a storage capacity determination carried out for the first time after the desulphating operation, and the result of the comparison (i.e., the difference between the two loading differential values) is evaluated as a measure of the desulphating effect achieved. In a second alternative, the minimum loading measured last before the desulphating process is compared with the minimum loading measured for the first time after the desulphating process, and the result of the comparison is in turn used as a measure of the desulphating effect achieved.

Other objects, advantages and novel features of the present invention will become apparent from the following detailed description of the invention when considered in conjunction with the accompanying drawings.

DETAILED DESCRIPTION OF THE DRAWINGS

The exemplary embodiments of the operating method according to the invention shown and explained in more detail below for an exhaust-emission control system with a nitrogen oxide adsorber preferably make use of a loading sensor which is assigned to the nitrogen oxide adsorber and with which the current loading of the nitrogen oxide adsorber with nitrogen oxides, usually adsorbed in nitrate form, can be continuously sensed directly, to be precise both during adsorption phases, in which the loading increases, and during regeneration phases, in which the loading decreases. For this purpose, the loading sensor described in the older German Patent Application No. 199 16 677.3, cited above and incorporated by reference herein in its entirety, can be used for example, it being possible to refer to this patent application for further details on how it functions.

Figure 1:
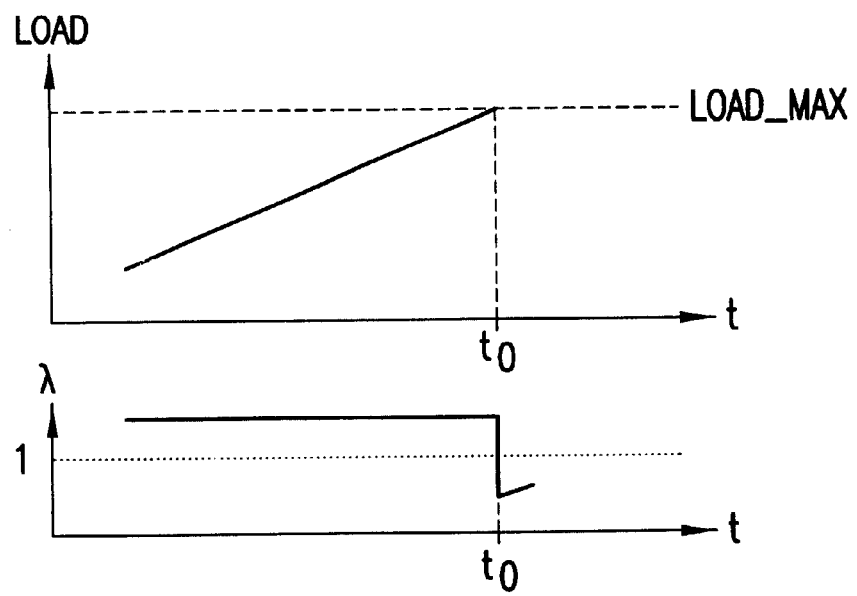
FIG. 1 shows diagrams for illustrating a changing-over operation from adsorption to regeneration of a nitrogen oxide adsorber of an exhaust-emission control system on reaching a maximum measured loading value.
Figure 2:
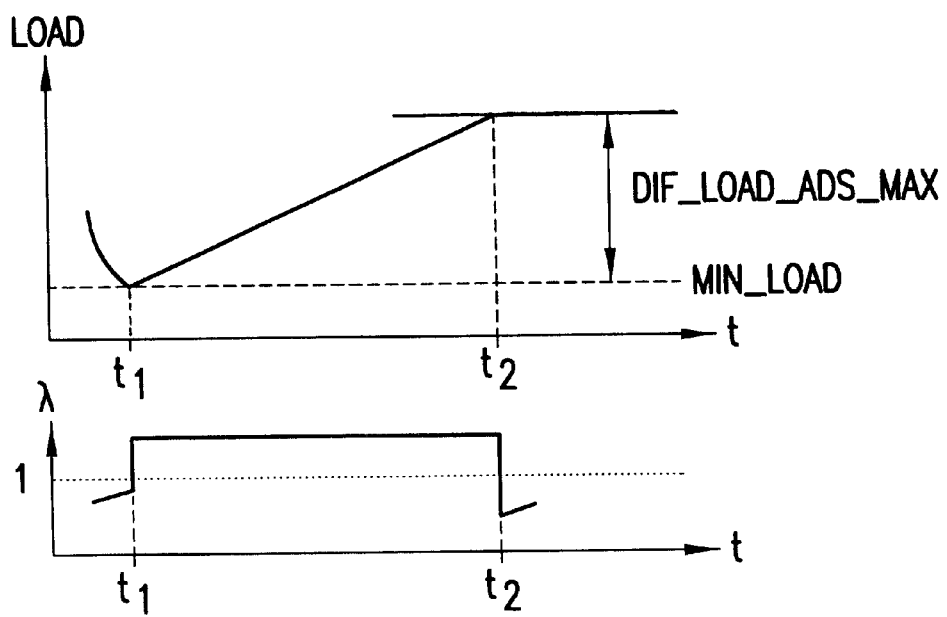
FIG. 2 shows diagrams for illustrating a changeover from adsorption to regeneration analogous to FIG. 1, but on the basis of a certain difference between the current measured loading and a minimum measured loading.

FIGS. 1 and 2 illustrate in the form of diagrams two variants specifically for detecting the necessity of a regeneration of the nitrogen oxide adsorber after previous adsorption operation. FIG. 1 schematically shows in the upper diagram of the two diagrams lying time-synchronously one below the other, the variation of the loading sensor signal LOAD, which is a direct measure of the loading of the nitrogen oxide adsorber with nitrogen oxides adsorbed in nitrate form, in dependence on the time t during an adsorption phase. In the lower diagram of FIG. 1, the exhaust air ratio 1 is plotted time-dependently, lying above the stoichiometric value of one during the adsorption phase, in which lean exhaust gas is fed to the nitrogen oxide adsorber. In the example of FIG. 1, the exceeding of a predetermined, maximum permissible loading value LOAD_MAX by the loading sensor signal LOAD is evaluated at a time $t_0$ as a criterion that the nitrogen oxide adsorber is filled to the maximum with adsorbed nitrogen oxides and therefore a changeover should be made from the adsorption operation to regeneration operation. For this purpose, the exhaust gas fed to the nitrogen oxide adsorber is changed over from the previously lean composition to a rich composition, i.e. the exhaust air ratio 1 suddenly changes to a substoichiometric value of less than one. This is brought about in one of the conventional ways, for example by changing over the associated combustion device, such as a motor-vehicle spark-ignition engine operated predominantly on a lean mixture, from previous lean operation to a temporary rich operating phase.

In the case of the variant illustrated in FIG. 2 for detecting a necessitated regeneration of the nitrogen oxide adsorber, the minimum loading MIN_LOAD is determined from the continuously supplied loading sensor signal LOAD at the time $t_1$ of the ending of a regeneration phase, i.e. the changeover from regeneration to adsorption, and the increase DIF_LOAD_ADS=LOAD−MIN_LOAD in the loading of the nitrogen oxide adsorber is subsequently observed continuously during the adsorption phase. As soon as this increase in loading DIF_LOAD_ADS exceeds a predeterminable associated maximum increase value DIF_LOAD_ADS_MAX, this is evaluated as a criterion for interrupting the adsorption operation again, at the relevant time $t_2$, for a regeneration phase.

The preset values LOAD_MAX and DIF_LOAD_ADS_MAX are to be fixed in the two cases of FIGS. 1 and 2 such that the nitrogen oxide emission downstream of the nitrogen oxide adsorber does not become inadmissibly high. For this purpose, they are chosen suitably, for example empirically, in dependence on the relevant influencing variables, such as the temperature of the nitrogen oxide adsorber, the storage capacity of the same and the operating point of the combustion device generating the exhaust gas, for example the motor-vehicle combustion engine. The preset values ascertained in this way are then stored in a control unit carrying out the method, for example in an engine control system of a combustion engine, which controls the engine and the associated exhaust-emission control system.

Figure 3:
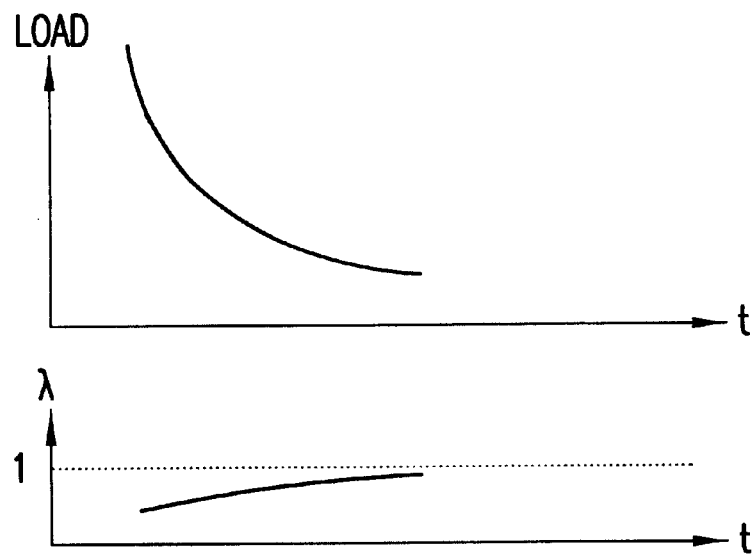
FIG. 3 shows diagrams for illustrating a regeneration phase with a loading-dependently varied exhaust air ratio.

FIG. 3 schematically shows a preferred way of carrying out a respective regeneration phase. With this type of nitrogen oxide adsorber regeneration shown, the exhaust air ratio 1, as shown in the lower diagram of FIG. 3, is steadily increased in the course of the regeneration phase from an initial value lying definitely in the rich, i.e. substoichiometric range, to be precise in dependence on the loading LOAD decreasing due to the regeneration effect, the typical variation over time of the said loading during the regeneration being schematically represented in the upper diagram of FIG. 3. The steady raising of the exhaust air ratio 1 with decreasing nitrogen oxide loading LOAD of the nitrogen oxide adsorber takes place in this case in such a way that the exhaust air ratio 1 still remains in the rich range, i.e. below the stoichiometric value of one. In this way, the exhaust air ratio 1 can be increased for example from an initial value of approximately 0.75, when there is high loading LOAD of the nitrogen oxide adsorber at the beginning of the regeneration, to a value lying only a little below one, of example between 0.9 and 1, towards the end of the regeneration phase. This loading-dependent adaptation of the exhaust air ratio 1 during the regeneration of the nitrogen oxide adsorber allows for the fact that the demand for reducing agents contained in the rich exhaust gas becomes less with decreasing loading of the nitrogen oxide adsorber. The adaptation thus achieved of the reducing agent supply to the demand at a given time avoids undesired reducing agent breakthroughs, i.e. an excess of reducing agents that cannot be used for nitrogen oxide reduction, which then have to be eliminated in some other way if they are not to get into the environment. As an alternative to the steady raising of the exhaust air ratio 1 during the nitrogen oxide adsorber regeneration, as shown, the raising may also take place in a number of steps or in a combined way, partly in steps and partly with steady progressions.

Figure 4:
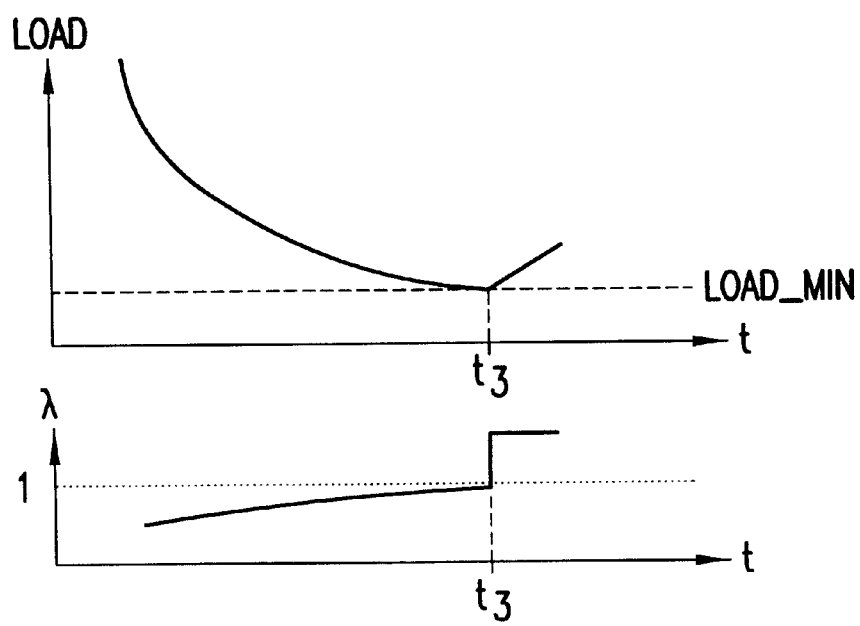
FIG. 4 shows diagrams for illustrating the changeover from regeneration to adsorption in dependence on the loading sensor signal.

FIG. 4 shows as a further example of the advantageous use of a directly measuring nitrogen-oxide loading sensor a first special way of fixing a suitable time for ending a respective regeneration phase for the nitrogen oxide adsorber. As can be seen from the two diagrams of FIG. 4, the decreasing loading LOAD of the nitrogen oxide adsorber is measured continuously with the loading sensor during a regeneration phase, as already shown in FIG. 3. As soon as the loading signal LOAD of the loading sensor falls below a predeterminable lower loading threshold value LOAD_MIN, this is evaluated as a criterion that adequate desorption of the nitrogen oxides temporarily stored previously in the nitrogen oxide adsorber has taken place and the regeneration can therefore be ended unless some other criterion precludes this. Accordingly, at the relevant time $t_3$, the exhaust-emission control system is changed over again from the regeneration phase to a subsequent adsorption phase, for which purpose the exhaust air ratio 1 is raised abruptly from the rich range below the stoichiometric value of one to a value greater than one, i.e. into the lean range. As a result of the fact that during the regeneration it is preferably raised in the direction of the stoichiometric value of one as the nitrogen oxide loading LOAD decreases, as explained above with respect to FIG. 3, the exhaust air ratio 1 typically already lies relatively closely below the stoichiometric value towards the end of a complete regeneration phase.

The lower loading threshold value LOAD_MIN is predetermined in dependence on influencing variables relevant for this, such as the engine operating point and the temperature and storage capacity of the nitrogen oxide adsorber catalyst at a given time, and is stored in the system control. The lower loading threshold value is chosen in this case such that on the one hand the nitrogen oxide adsorber is freed of adsorbed nitrogen oxides to the appropriate minimum loading during the regeneration phase and on the other hand reducing agent breakthroughs are avoided by prompt ending of the regeneration. This procedure avoids on the one hand excessively short regeneration, as a result of which the theoretical storage capacity of the nitrogen oxide adsorber is not fully reached, but on the other hand excessively long regeneration and an associated rise in reducing agent emissions downstream of the nitrogen oxide adsorber, in particular emissions of CO (carbon monoxide) and HC (uncombusted hydrocarbons).

Figure 5:
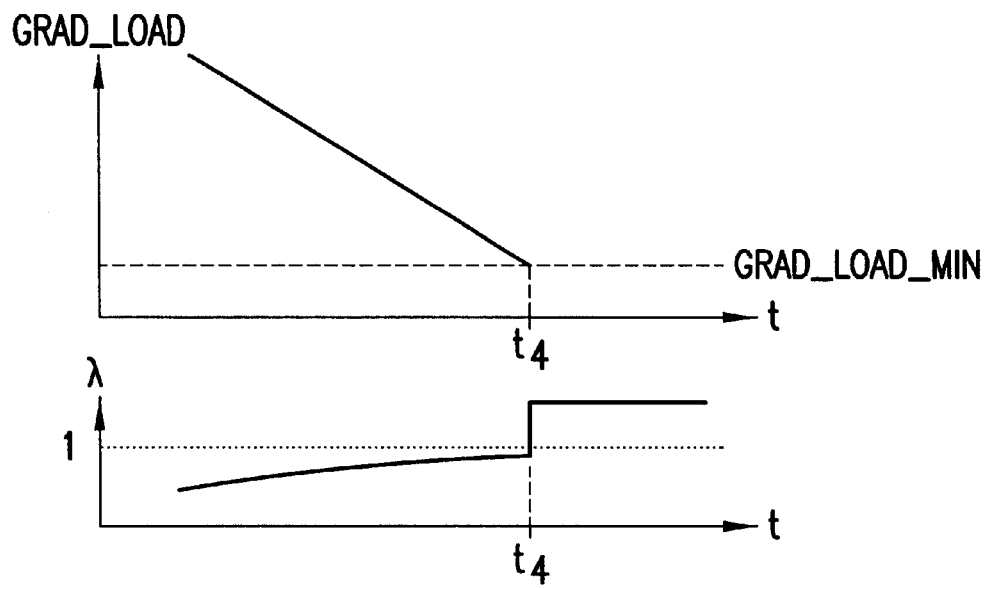
FIG. 5 shows diagrams for illustrating the changeover from regeneration to adsorption in dependence on the gradient of the loading sensor signal.

FIG. 5 illustrates a first alternative procedure for finding an optimum time for changing over from regeneration to adsorption. This procedure comprises the continuous ascertainment of the amount GRAD_LOAD of the (negative) gradient of the loading sensor signal LOAD during the regeneration. As already revealed by the loading sensor signal diagrams of FIGS. 3 and 4 and in turn schematically illustrated in the diagrams of FIG. 5, this gradient amount GRAD_LOAD decreases steadily in the course of the regeneration phase. During this, the exhaust air ratio 1 again lies in the rich range, preferably tending to rise in the direction of the stoichiometric value of one. As a criterion for ending regeneration, it is then evaluated when the gradient amount GRAD_LOAD falls below a predeterminable lower threshold value GRAD_LOAD_MIN. Unless precluded by some other criterion, at the relevant time $t_4$ the operation of the exhaust-emission control system is changed back to adsorption operation, i.e. to a lean composition of the exhaust gas with an air ratio 1 lying above the stoichiometric value of one. The lower threshold value for the gradient amount GRAD_LOAD_MIN is fixed in accordance with the same aspects as are specified above for the choice of the lower loading threshold value LOAD_MIN and is stored in the system control.

Figure 6:
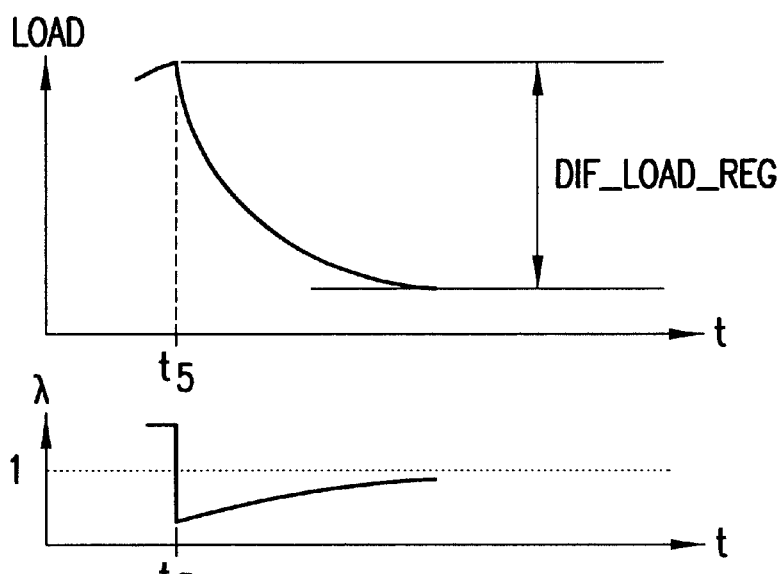
FIG. 6 shows diagrams for illustrating the decrease in loading measured during a regeneration phase and a changeover to adsorption operation based thereupon.

A third possibility for detecting the optimum time for ending regeneration is illustrated in FIG. 6. As represented in the diagrams there, after the beginning of a respective regeneration phase at an associated time $t_5$, at which the loading sensor signals the necessity of a nitrogen oxide adsorber regeneration, the nitrogen oxide loading is again continuously sensed during the regeneration phase and the difference in loading DIF_LOAD_REG between the current loading sensor signal value LOAD and the maximum signal value at the beginning of regeneration is thereby ascertained, in particular continuously. As soon as the amount of this differential value DIF_LOAD_REG then exceeds a suitably predetermined and stored maximum differential value DIF_LOAD_REG_MAX due to the decrease in loading during the regeneration, this is evaluated as a criterion for ending regeneration.

The procedures for fixing the end of regeneration described with respect to FIGS. 4 to 6 may be combined if desired with a conventional method. For example, a lambda probe may be used downstream of the nitrogen oxide adsorber and its sensor signal used additionally as a further criterion for ending regeneration. In this case, the regeneration can be ended at the latest when a reducing agent breakthrough is detected by the lambda probe, even if the criterion for ending regeneration derived from the loading sensor signal has not yet been satisfied, for example because of a fluctuating adsorber temperature or changing adsorber storage capacity. This also offers the possibility of adapting the relevant threshold value for the loading sensor signal or the amount of its gradient to the current operating conditions.

Figure 7:
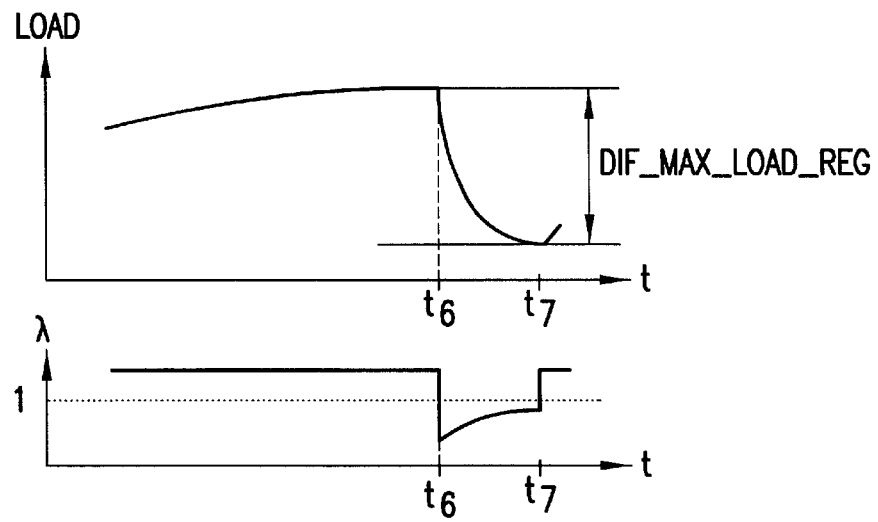
FIG. 7 shows diagrams for illustrating a storage capacity determination on the basis of the decrease in loading during a regeneration phase.

FIG. 7 illustrates a further case of using a directly measuring loading sensor assigned to the nitrogen oxide adsorber, to be precise for determining the storage capacity, i.e. storage capability, of the nitrogen oxide adsorber typically at relatively great time intervals, in the case of the application in a motor vehicle for example each time after a certain traveling distance of, for example, several thousand kilometers is reached. For this purpose, as illustrated in FIG. 7, the exhaust-emission control system is initially operated in a single long adsorption phase up to a time $t_6$, at which the nitrogen oxide adsorber is fully saturated with nitrogen oxides. This is detected by the fact that the loading signal LOAD of the leading sensor no longer shows a significant rise. At this time $t_6$, a changeover is then made to a regeneration phase, i.e. the exhaust air ratio 1 is controlled to an initial strong rich value, from which it is then preferably raised again during the regeneration in the direction of the stoichiometric value of one. The regeneration phase is maintained until the loading sensor signal no longer falls any further, i.e. reaches a minimum value, at a corresponding time $t_7$. Then, the difference in loading signal DIF_MAX_LOAD_REG between the maximum value at the beginning of the regeneration and the minimum value at the end of the complete regeneration phase is determined. This difference in loading signal DIF_MAX_LOAD_REG is a direct measure of the current storage capacity of the nitrogen oxide adsorber, since it directly indicates the amount of desorbed nitrogen oxides, which can be temporarily stored again in a subsequent adsorption phase. At the same time as the determination of the maximum difference in loading signal DIF_MAX_LOAD_REG, a changeover is then again made to adsorption operation at the relevant time $t_7$.

As is known, the storage capacity of a nitrogen oxide adsorber is reduced over a relatively long operating time, in particular when there are excessive thermal effects and in the case of exhaust gases containing sulphur. The reduction in capacity due to sulphur incorporation can be at least partially reversed by special regeneration phases in the form of desulphating operations, as known from the prior art cited at the beginning. Knowledge of the current storage capacity of the nitrogen oxide adsorber is of interest for this reason as well. As an alternative to the ascertainment of the storage capability at relatively great time intervals described above with respect to FIG. 7, by means of a complete nitrogen oxide adsorption and nitrogen oxide desorption cycle in each case, the minimum MIN_LOAD of the loading sensor signal reached at the end of each regeneration phase may also serve as a measure of the current, remaining storage capacity. In this case, the falling of the loading sensor signal LOAD below a predetermined lower loading threshold value LOAD_MIN must not of course be used as a criterion for the ending of a respective regeneration, as described with respect to FIG. 4, but instead for example one of the criteria explained with respect to FIGS. 5 and 6 or a conventional criterion for ending regeneration must be used. If the ending of the regeneration then always takes place on the basis of the same criterion, the minimum measured loading value MIN_LOAD at the end of regeneration provides a reliable indication as to the changing of the storage capacity.

In the case of a decrease in the storage capability, for example as a consequence of sulphur incorporation, this loading minimum value MIN_LOAD gradually increases from regeneration phase to regeneration phase, since the remaining loading component contributes to the loading sensor signal LOAD, for example on account of the adsorbed sulphates. According to a first variant of the method, this gradual increase in the measured loading minimum value MIN_LOAD can be related to a fixed reference value, for example the loading minimum value in the new state of the nitrogen oxide adsorber, or according to a second variant of the method it can be ascertained over a number of successive regeneration cycles predeterminable in the system control.

Figure 8:
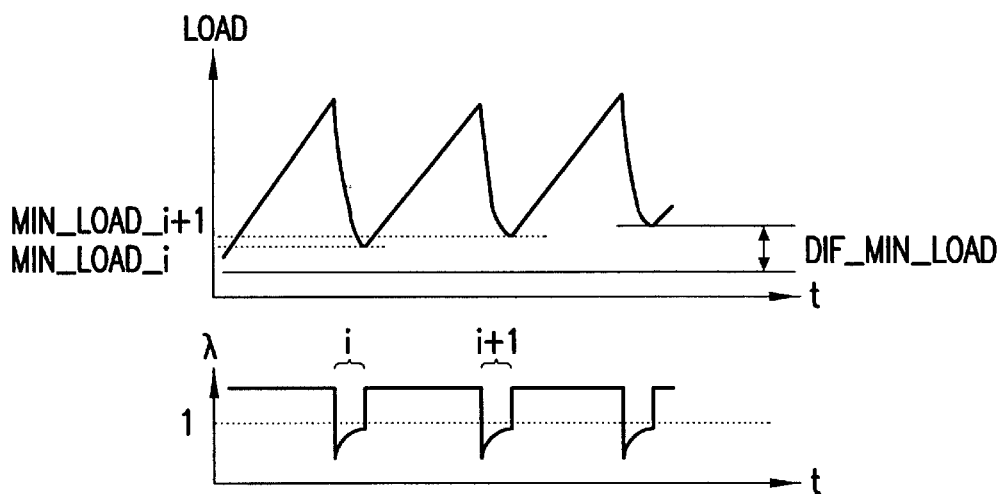
FIG. 8 shows diagrams for illustrating a storage capacity determination on the basis of minimum measured loading values for successive regeneration phases.

This procedure for determining the residual loading is illustrated in FIG. 8. For each regeneration cycle i, i+1, ... (i=1,2, ... ), the associated minimum value MIN_LOAD_i of the loading sensor is established at the end of regeneration, and the difference DIF_MIN_LOAD is formed between the last of the successive loading minimum values MIN_LOAD_i, MIN_LOAD_i+1, ... in each case and a fixed reference value or the loading minimum value of a regeneration cycle, which lies earlier than the final regeneration cycle by the predetermined number of regeneration cycles to be taken into consideration. This differential value DIF_MIN_LOAD is consequently a measure of the remaining residual loading of the nitrogen oxide adsorber or its gradual increase.

On the basis of one or the other of the procedures described above with respect to FIGS. 7 and 8, the necessity or expediency of a desulphating operation to be carried out can be established. For this purpose, when applying the method of determining storage capacity according to FIG. 7 a suitably chosen capacity minimum value DIF_MAX_LOAD_REG_MIN is predetermined and the necessity of desulphating the nitrogen oxide adsorber is concluded when the currently ascertained storage capacity, i.e. the maximum loading differential signal DIF_MAX_LOAD_REG of the loading sensor, falls below the predetermined capacity minimum value DIF_MAX_LOAD_REG_MIN. If the procedure described with respect to FIG. 8 is used, a residual loading maximum value DIF_MIN_LOAD_MAX is suitably predetermined in a corresponding way and stored in the system control, and the necessity of a desulphating operation is concluded when the currently ascertained residual loading, i.e. the minimum differential value DIF_MIN_LOAD of the loading sensor signal, exceeds the associated differential threshold value DIF_MIN_LOAD_MAX.

Figure 9:
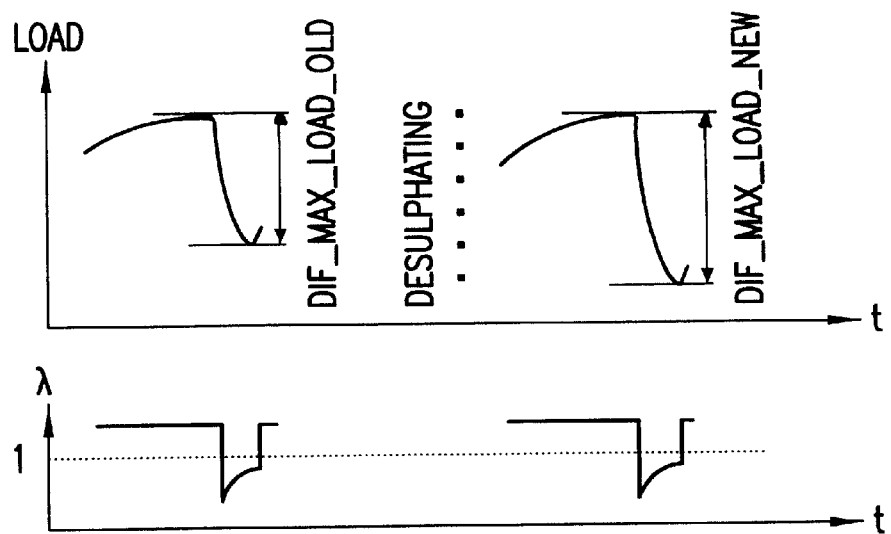
FIG. 9 shows diagrams for illustrating a determination of the effect of a respective desulphating operation on the basis of a comparison of the decrease in loading during a regeneration phase before and after the desulphating process.
Figure 10:
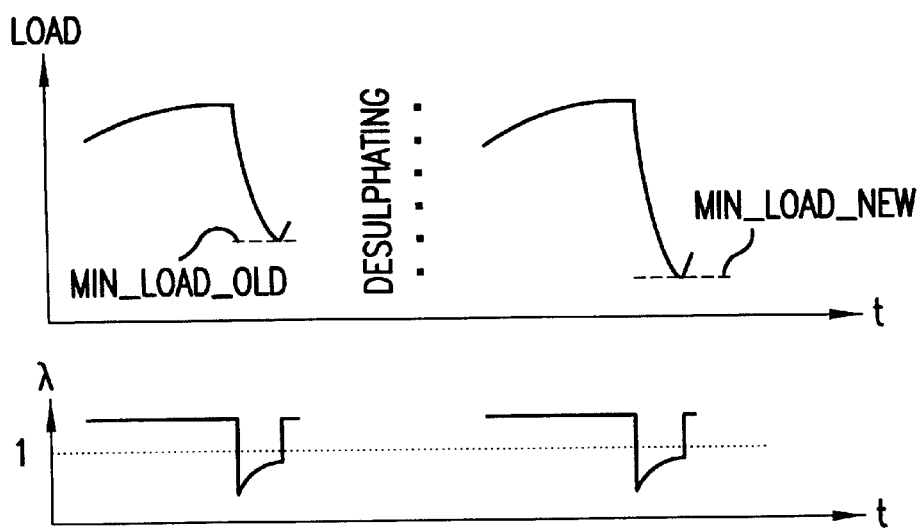
FIG. 10 shows diagrams for illustrating the determination of the effect of a respective desulphating phase on the basis of minimum measured loading values at the end of a respective regeneration phase before and after the desulphating process.

If the necessity of desulphating the nitrogen oxide adsorber has been detected by one or the other of the ways described and a desulphating operation has been carried out in the conventional manner, it is desirable to be able to establish the effect, i.e. the success, of the desulphating process carried out. Two possible procedures for this, which again make use of a loading sensor continuously measuring the nitrogen oxide loading even during the regeneration phases, are illustrated in FIGS. 9 and 10. In the case of the variant of FIG. 9, for this purpose the current storage capacity DIF_MAX_LOAD_OLD during the final regeneration phase before the desulphating operation, and correspondingly the current storage capacity DIF_MAX_LOAD_NEW during the first regeneration phase after the desulphating operation, are respectively determined by the method explained with respect to FIG. 7 and the increase in capacity achieved is calculated as a corresponding differential value DIF_DESULF_MAX_LOAD_REG=DIF_MAX_LOAD_NEW−DIF_MAX_LOAD_OLD. If this differential value DIF_DESULF_MAX_LOAD_REG thus ascertained lies below an associated, predetermined minimum value DIF_DESULF_MAX_LOAD_REG_MIN, the desulphating operation is judged to be unsuccessful.

Alternatively, in a way similar to the case of the procedure according to FIG. 10, the minimum loading value MIN_LOAD_OLD for the last regeneration before the desulphating process and the corresponding minimum loading value MIN_LOAD_NEW for the first regeneration after the desulphating process are ascertained in accordance with the method of FIG. 8 and the associated difference DIF_DESULF_MIN_LOAD MIN_LOAD_OLD−MIN_LOAD_NEW is formed. If this differential value DIF_DESULF_MIN_LOAD remains below a predetermined minimum value DIF_DESULF_MIN_LOAD_MIN, the desulphating operation is again judged to be unsuccessful.

Figure 11:
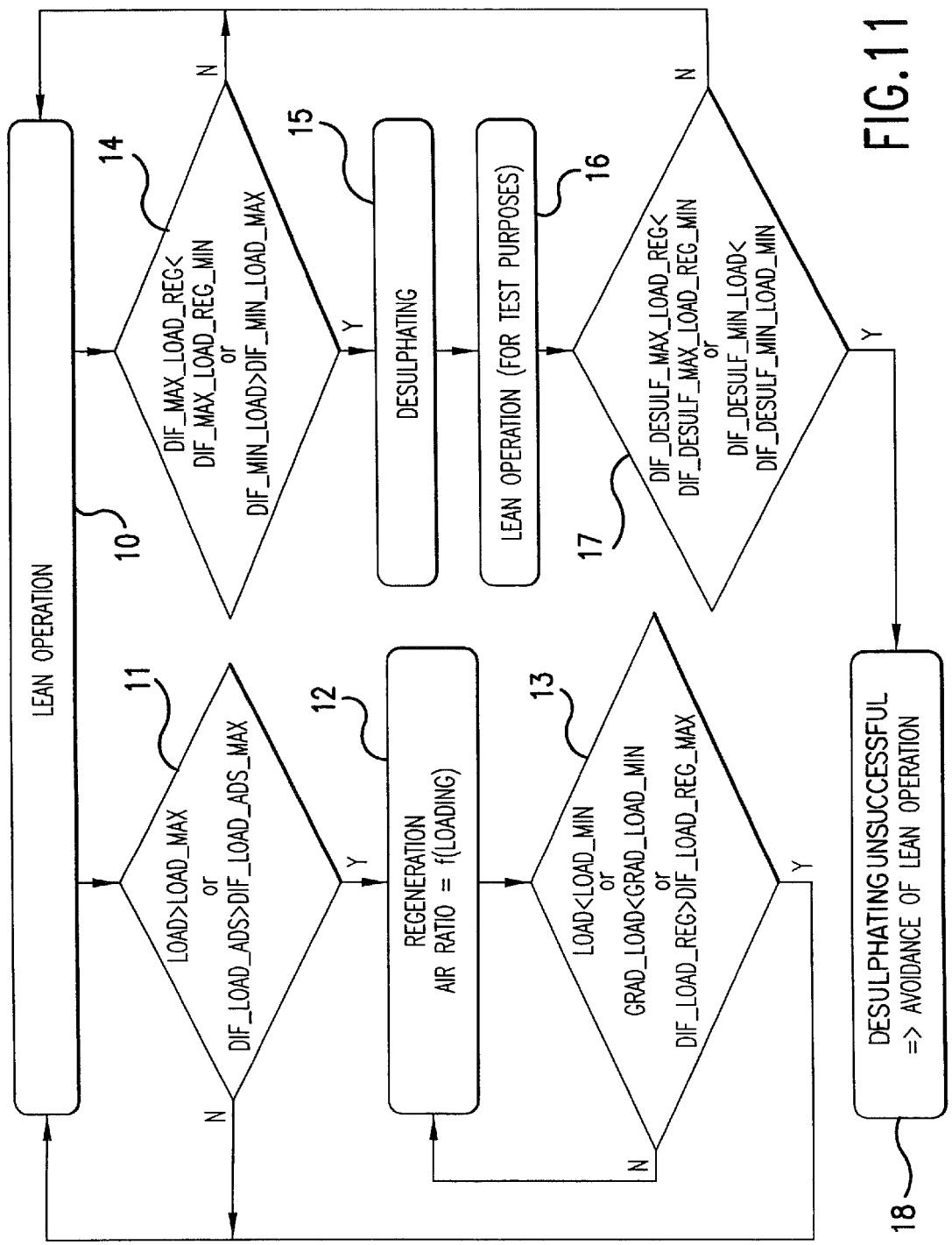
FIG. 11 shows a flow diagram of a method of operating an exhaust-emission control system using the measures illustrated in FIGS. 1 to 10.

Using the individual procedures explained above with respect to FIGS. 1 to 10, the following operating method, illustrated in the flow diagram of FIG. 11, can therefore be realized for an exhaust-emission control system with a nitrogen oxide adsorber and a directly measuring loading sensor, for example for cleaning the exhaust gases of a motor-vehicle combustion engine operated on a lean concept.

As shown in FIG. 11, the combustion device from which the exhaust gas is to be cleaned is primarily operated in lean mode (step 10), the associated exhaust-emission control system being in the operating state of adsorption of the nitrogen oxide adsorber. Starting from this state, it is continuously checked in an interrogation step 11 whether the nitrogen oxide take-up capacity of the nitrogen oxide adsorber is exhausted and a regeneration phase should be activated. This decision takes place on the basis of the loading sensor signal LOAD or its gradient amount DIF_LOAD_ADS by comparison with the associated threshold values, as explained above with respect to FIGS. 1 and 2. If the interrogation criterion used is satisfied, a changeover to regeneration operation is made (step 12), for example by changing over the fuel/air mixture fed to the combustion engine from lean to rich. The loading of the nitrogen oxide adsorber continues to be continuously measured directly with the loading sensor during the regeneration phase as well. The exhaust air ratio is set variably during the regeneration as a function of the loading measured, as explained above with respect to FIG. 3. Parallel to this, it is continuously checked in a corresponding interrogation step 13 whether the predetermined criterion for ending regeneration has occurred, i.e. has been satisfied, which is established in accordance with one of the procedures for this described above with respect to FIGS. 4 to 6, which comprise a comparison of the loading sensor signal LOAD, its gradient amount GRAS_LOAD or the measured decrease in loading DIF_LOAD_REG with a respectively associated threshold value. If the relevant criterion for ending regeneration has been satisfied, a return is made again to lean operation (step 10).

Parallel to the interrogation as to the necessity of regeneration, it is continuously checked in a corresponding interrogation step 14 during lean operation (step 10) whether a special regeneration in the form of a desulphating operation is necessary, for which purpose one of the two criteria described above with respect to FIGS. 7 and 8 is applied. If the relevant desulphating criterion has been satisfied, a changeover is made from lean operation (step 10) to a desulphating operation 15 of a conventional type. Once desulphating has ended, the system is then initially operated for test purposes in lean mode again (step 16). During this, the effect of the previous desulphating process is checked by an interrogation step 17, in which the desulphating effect achieved is ascertained in accordance with one of the procedures described above with respect to FIGS. 9 and 10. If it is established during this ascertainment that the storage capacity of the nitrogen oxide adsorber has increased again adequately as a result of the desulphating process, the system remains in lean operation (step 10). If, on the other hand, only an inadequate desulphating effect is established, the reduction in the storage capacity is attributable to damage because of high temperatures, which is not reversible. In this case, further lean operation is prevented by the system and the associated combustion device continues to be operated only with a stoichiometric or rich fuel/air mixture (step 18), if it can be assumed that the damage to the nitrogen oxide adsorber relates only to the components required for lean operation and does not impair its function in stoichiometric operation. In addition, if need be, an indication may be provided, for example for the motor-vehicle driver, that the nitrogen oxide adsorber should be serviced and possibly changed.

As the above description of some advantageous examples shows, the method according to the invention makes possible an optimum controlled changeover between adsorption and regeneration phases for each of possibly a number of nitrogen oxide adsorber catalysts of an exhaust-emission control system using a respectively assigned loading sensor which has the capability of continuously sensing the degree of loading of the adsorber even during regeneration operation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating an exhaust-emission control system, comprising:

alternately operating a nitrogen oxide adsorber in adsorption phases with an at least stoichiometric exhaust air ratio and in regeneration phases with an at most stoichiometric exhaust air ratio;

wherein, during a respective regeneration phase, a load of the nitrogen oxide adsorber with nitrogen oxides is continuously measured directly by a loading sensor, and wherein an air ratio of an exhaust gas fed to the nitrogen oxide adsorber is increased as the measured load decreases.

2. A method of operating an exhaust-emission control system according to claim 1, wherein, if the measured load falls below a predeterminable lower load threshold value, a respective regeneration phase is ended.

3. A method of operating an exhaust-emission control system according to claim 1, wherein if the amount of a gradient of the measured load falls below a predeterminable lower gradient-amount threshold value, a respective regeneration phase is ended.

4. A method of operating an exhaust-emission control system according to claim 1, wherein if the amount of a decrease of the measured load exceeds a predeterminable loading-decrease threshold value since the beginning of a regeneration phase, the regeneration phase is ended.

5. A method of operating an exhaust-emission control system according to claim 1, further comprising:

determining a storage capacity of the nitrogen oxide adsorber from time to time by measuring a difference between a maximal load when the nitrogen oxide adsorber is initially saturated with nitrogen oxides in an adsorption phase and when the nitrogen oxide absorber is at the end of a regeneration phase at which the load measured by the loading sensor reaches a minimum value, wherein the difference is evaluated as a measure of the current storage capacity of the nitrogen oxide adsorber.

6. A method of operating an exhaust-emission control system according to claim 1, further comprising measuring the load of the nitrogen oxide adsorber at a time at which a predeterminable condition for ending a regeneration phase occurs, and calculating a current remaining residual load of the nitrogen oxide adsorber with this measured minimum loading.

7. A method according to claim 5, further comprising carrying out a desulfurizing regenerating phase for the nitrogen oxide adsorber if the difference in load, indicative of the storage capacity, falls below a predetermined minimum differential threshold value.

8. A method according to claim 6, further comprising carrying out a desulphating regenerating phase for the nitrogen oxide adsorber if the minimum loading measured in successive regeneration phases rises by more than a predeterminable degree.

9. A method according to claim 7, wherein the difference between the storage capacity ascertained before a desulphating regenerating operation and the difference in storage capacity ascertained for the first time after the desulphating regenerating operation is calculated as a measure of the desulphating effect achieved by the desulphating regenerating operation.

10. A method according to claim 7, wherein the difference between the minimum load measured before a desulphating regenerating operation and the minimum load measured for the first time after the desulphating regenerating operation is calculated as a measure of the desulphating effect achieved by the desulphating regenerating operation.

* * * * *